(12) United States Patent
McCarty

(10) Patent No.: US 6,726,235 B2
(45) Date of Patent: Apr. 27, 2004

(54) TRAILER MOVER

(76) Inventor: William V. McCarty, 5900 Kugler Mill Rd., Cincinnati, OH (US) 45236

( * ) Notice: Subject to any disclaimer, the term of this patent is extended or adjusted under 35 U.S.C. 154(b) by 299 days.

(21) Appl. No.: 09/941,292

(22) Filed: Aug. 28, 2001

(65) Prior Publication Data

US 2003/0042707 A1 Mar. 6, 2003

(51) Int. Cl.$^7$ ................................................ B60D 1/66
(52) U.S. Cl. ...................................... 280/475; 280/249
(58) Field of Search .......................... 280/475, 242.1, 280/249; 180/15, 11, 12, 13

(56) References Cited

U.S. PATENT DOCUMENTS

| 3,356,172 A | * | 12/1967 | Peckham | 180/19.2 |
|---|---|---|---|---|
| 3,380,546 A | * | 4/1968 | Rabjohn | 180/19.2 |
| 3,705,638 A | * | 12/1972 | Shock | 180/19.3 |
| 3,783,960 A | | 1/1974 | Feliz | |
| 3,841,663 A | * | 10/1974 | Proffit | 280/475 |
| 3,861,482 A | * | 1/1975 | Stephens | 180/19.1 |
| 3,944,259 A | * | 3/1976 | Miller | 280/475 |
| 4,266,796 A | | 5/1981 | Riggs et al. | |
| 4,307,894 A | * | 12/1981 | Habeshian | 280/475 |
| 4,779,889 A | | 10/1988 | Morrison | |
| 5,016,900 A | * | 5/1991 | McCully | 180/19.2 |
| 5,325,934 A | | 7/1994 | Larson | |
| 5,338,047 A | * | 8/1994 | Knisley | 280/475 |
| 5,725,233 A | * | 3/1998 | Gee et al. | 280/475 |

FOREIGN PATENT DOCUMENTS

| CA | 563650 | * | 9/1958 | 280/475 |
|---|---|---|---|---|
| FR | 896592 | * | 2/1945 | 280/475 |

* cited by examiner

*Primary Examiner*—Daniel G. DePumpo
(74) *Attorney, Agent, or Firm*—Sturm & Fix LLP

(57) ABSTRACT

A trailer mover secured to the forwardly extending tongue of a recreational or multi-purpose trailer. The trailer mover includes a bracket pivotally attached to the trailer tongue and a gearbox rotatably attached to the bracket. The gearbox is pivotally movable between a lowered vertical working position and a raised horizontal storage position. Further, the gearbox is selectively rotatable with respect to the bracket to allow steering when in the working position. A rubber-tired groundwheel extends from the distal end of the gearbox and is powered by a hand crank, which drives a set of gears which provide a mechanical advantage.

4 Claims, 2 Drawing Sheets

TRAILER MOVER

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of multi-purpose trailer accessories, and more particularly, to a device for moving and maneuvering multi-purpose trailers designed to be towed behind a passenger vehicle.

2. Description of Related Art

As can be seen by reference to the following U.S. Pat. Nos. 3,783,960; 4,266,796; 4,779,889 and 5,325,934, the prior art is replete with myriad and diverse trailer dollies and drivers.

While all of the aforementioned prior art constructions are more than adequate for the basic purpose and function for which they have been specifically designed, they are uniformly deficient with respect to their failure to provide a simple, efficient, and practical trailer mover.

As a consequence of the foregoing situation, there has existed a longstanding need for a new and improved trailer mover and the provision of such a construction is a stated objective of the present invention.

BRIEF SUMMARY OF THE INVENTION

Briefly stated, the present invention provides a trailer mover secured to the forwardly extending tongue of a recreational or multi-purpose trailer. The trailer mover includes a bracket pivotally attached to the trailer tongue and a gearbox rotatably attached to the bracket. The gearbox is pivotally movable between a lowered vertical working position and a raised horizontal storage position. Further, the gearbox is selectively rotatable with respect to the bracket to allow steering when in the working position. A rubber-tired groundwheel extends from the distal end of the gearbox and is powered by a hand crank, which drives a set of gears, which provide a mechanical advantage.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
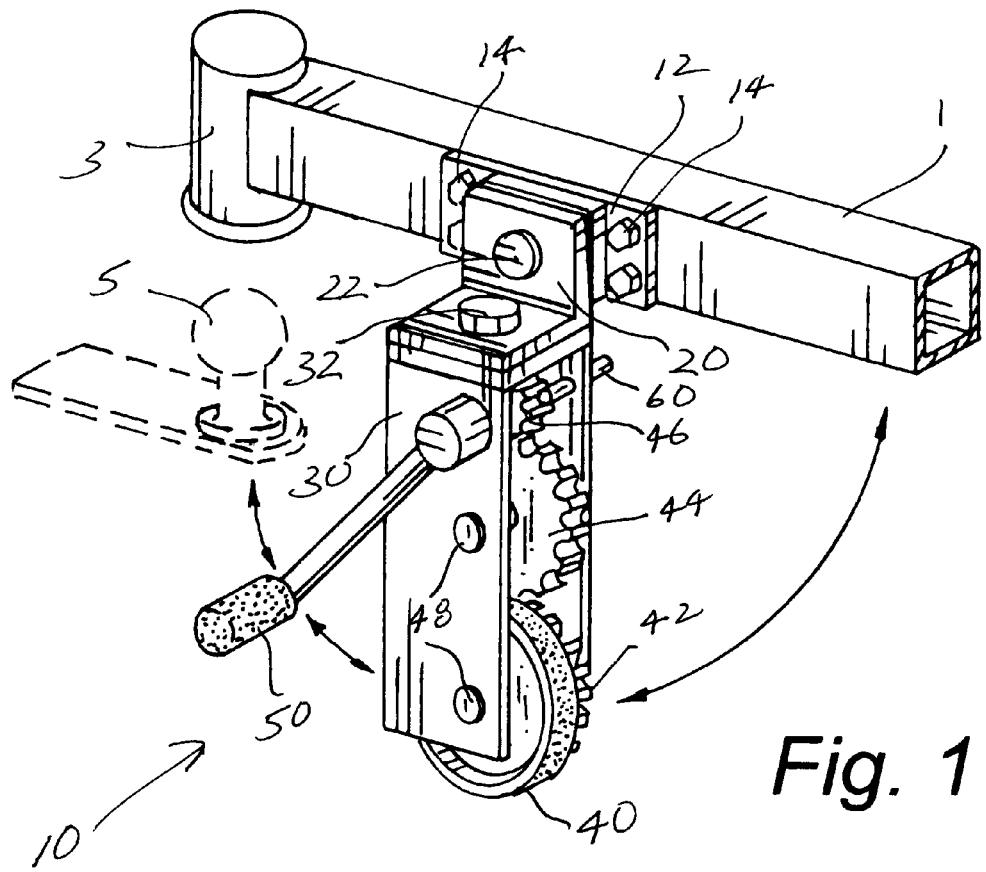
FIG. 1 is a partial perspective view showing the trailer mover pivotally attached to the tongue of a trailer.

As can be seen by reference to the drawings, and in particularly to FIG. 1, the trailer mover that forms the basis of the present invention is designated generally by the reference number 10.

The trailer mover 10 is adapted to be attached to the forwardly extending tongue 1 of a recreational or multi-purpose trailer for boats, snowmobiles, campers, mowers or other items. The trailer mover 10 is attached to the tongue 1 at the forward end near the socket 3 that receives the ball hitch 5 of a towing vehicle. A mounting plate 12 is attached by bolts 14 to the side of the tongue 1. An L-shaped bracket 20 is pivotally attached to the mounting plate 12 by a pin 22 having a horizontal axis. A gearbox 30 is rotatably attached to the bracket 20 by a pin 32 which has a second axis disposed substantially perpendicular to the horizontal axis of the pin 22. The gearbox 30 is thus selectively pivotally movable about the horizontal axis of pin 22 between a lowered working position and a raised storage position, and selectively rotatable about the axis of pin 32 with respect to the bracket 20 when it is in the lowered working position.

Figure 2:
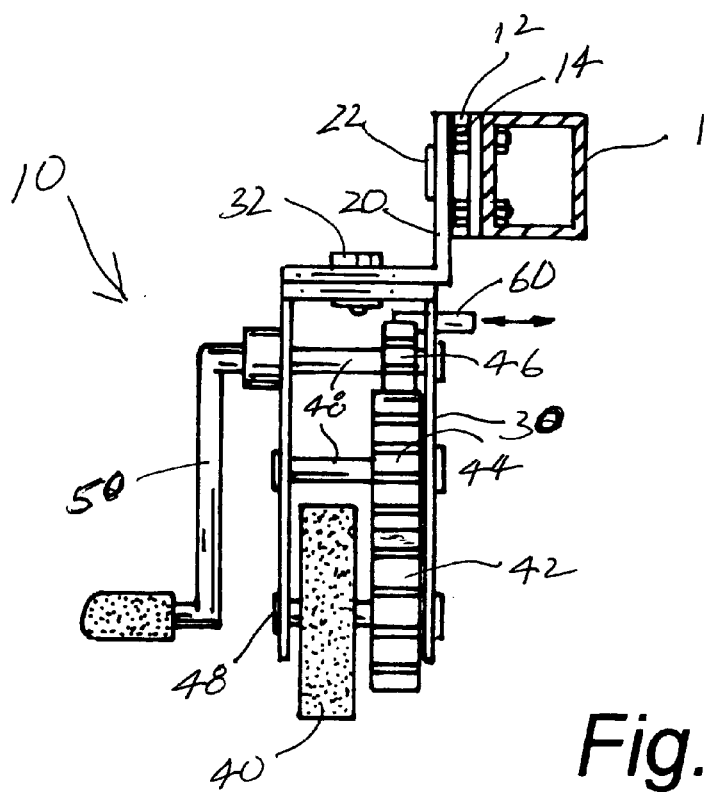
FIG. 2 is a rear elevational view showing the trailer mover in the lowered working position.
Figure 4:
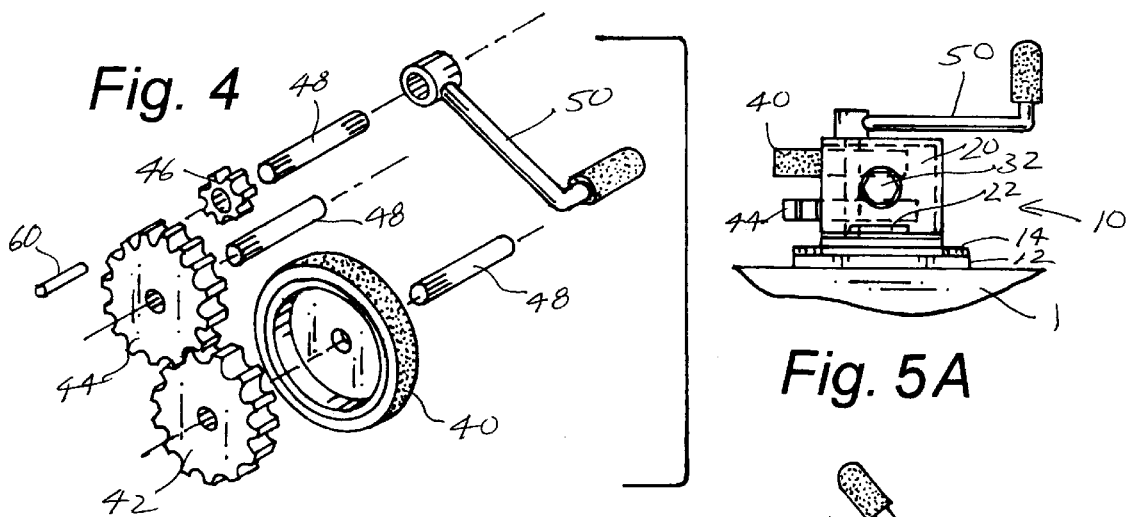
FIG. 4 is an exploded perspective view showing the components of the drive mechanism housed in the gearbox.

As best shown in FIGS. 2 and 4, the gearbox 30 has a rubber tire groundwheel 40 rotatably mounted to extend out from the distal end, a driven gear 42 attached to the groundwheel 40, an idler gear 44, and a drive gear 46 coupled to a hand crank 50. The gears, 42, 44, 46 are journaled on shafts 48 as illustrated in FIG. 4 so that the hand crank 50 acts to drive the groundwheel 40 and provide a mechanical advantage. A lock pin 60 is journaled in the gearbox 30 and is selectively movable between a locked position engaging the drive gear 46 and an unlocked position disengaged from the drive gear 46 as indicated by the directional arrow in FIG. 2.

Figure 3:
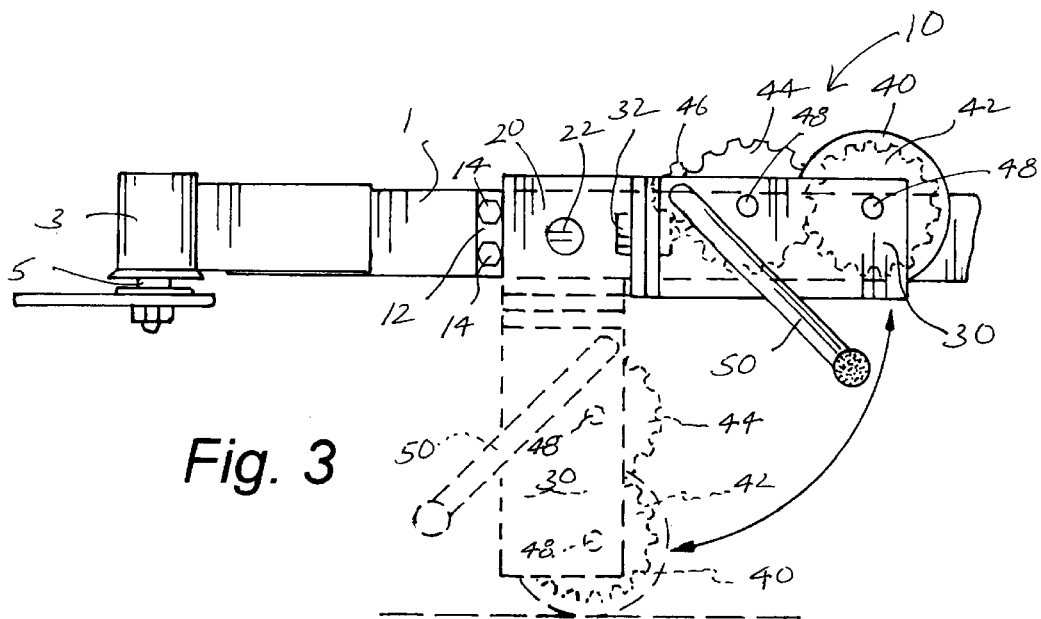
FIG. 3 is a side elevational view showing the trailer mover in the raised storage position with a dashed line showing of the trailer mover in the lowered working position.
Figure 5A:
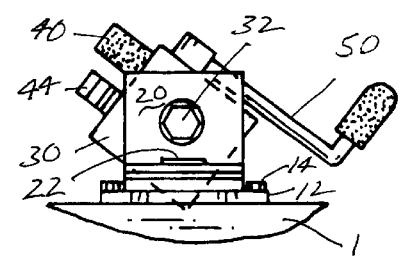
FIG. 5A is a partial top plan view showing the gearbox rotated to a position where the groundwheel provides straight-ahead steering for the trailer.
Figures 5B, 5C:
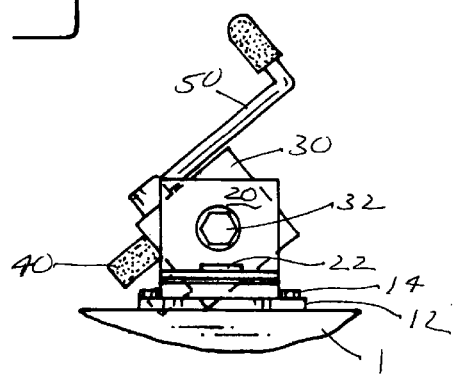
FIG. 5B is a partial top plan view similar to FIG. 5A, but showing the gearbox positioned so that the groundwheel steers to the right.
FIG. 5C is a partial top plan view similar to FIG. 5A, but showing the gearbox positioned so that the groundwheel steers to the left.

In operation, the trailer mover 10 is positioned in the raised storage position as shown in full line in FIG. 3 when the trailer tongue 1 is attached to the hitch 5 of the towing vehicle. When disconnected from the towing vehicle, the trailer mover 10 is pivoted downwardly about the horizontal axis of pin 22 so that the groundwheel 40, engages the ground to support the front end of the trailer. The lock pin 60 is then disengaged from the drive gear 46 and the hand crank 50 is turned to drive the groundwheel 40 to move the trailer as desired with a significant mechanical advantage provided by the crank 50 and the gears 42, 44, 46. Although the idler gear 44 may be eliminated, it is provided in the preferred embodiment to raise the hand crank 50 to a more comfortable position and improve the mechanical advantage of the system. Maneuvering and steering of the trailer is provided by the rotation of the gearbox 30 about the axis of pin 32 as illustrated in FIGS. 5A, 5B and 5C.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. A trailer mover for a trailer including a forwardly extending tongue, the trailer mover comprising:

a bracket pivotally attached about a horizontal axis to the tongue of the trailer;

a gearbox rotatably attached to the bracket about a second axis disposed perpendicular to the horizontal axis, the gearbox being selectively movable between a vertically disposed lowered working position and a horizontally disposed raised storage position by pivoting the bracket about the horizontal axis, the gearbox being further selectively rotatable with respect to the bracket about the second axis when in the lowered working position;

a groundwheel rotatably mounted in the gearbox and disposed to extend out from the distal end thereof;

a driven gear rotatably mounted in the gearbox and operably attached to the groundwheel;

a drive gear rotatably mounted in the gearbox and drivably coupled to the driven gear;

a hand crank journaled in the gearbox and drivably coupled to the drive gear; and a lock pin journaled in the gearbox and being selectively movable between a locked position in engagement with the drive gear and an unlocked position disengaged from the drive gear.

2. The trailer mover of claim 1 further including an idler gear rotatably mounted in the gearbox and disposed to drivably interconnect the drive gear and the driven gear.

3. The trailer mover of claim 1 wherein the groundwheel is a rubber tire.

4. The trailer mover of claim 2 wherein the groundwheel is a rubber tire.

* * * * *